United States Patent
Zhou et al.

(10) Patent No.: US 12,473,239 B2
(45) Date of Patent: Nov. 18, 2025

(54) COMPLEX MICROBIAL AGENT AND APPLICATIONS THEREOF

(71) Applicant: HUBEI MAOSHENG BIOLOGY CO., LTD., Suizhou (CN)

(72) Inventors: Yixin Zhou, Suizhou (CN); Jie Huang, Suizhou (CN); Yu Jiang, Suizhou (CN); Wei Li, Suizhou (CN); Deng Fan, Suizhou (CN); Wanyang Chen, Suizhou (CN); Shibai Zhang, Suizhou (CN)

(73) Assignee: HUBEI MAOSHENG BIOLOGY CO., LTD., Suizhou (CN)

( * ) Notice: Subject to any disclaimer, the term of this patent is extended or adjusted under 35 U.S.C. 154(b) by 0 days.

(21) Appl. No.: 18/985,109

(22) Filed: Dec. 18, 2024

(65) Prior Publication Data

US 2025/0206680 A1 Jun. 26, 2025

Related U.S. Application Data

(63) Continuation of application No. PCT/CN2024/111602, filed on Aug. 13, 2024.

(30) Foreign Application Priority Data

Dec. 25, 2023 (CN) .......... 202311799694.5

(51) Int. Cl.
| | |
|---|---|
| C05F 11/08 | (2006.01) |
| A01N 63/25 | (2020.01) |
| A01P 21/00 | (2006.01) |
| C12N 1/20 | (2006.01) |
| C12R 1/01 | (2006.01) |

(52) U.S. Cl.
CPC .............. *C05F 11/08* (2013.01); *A01N 63/25* (2020.01); *A01P 21/00* (2021.08); *C12N 1/205* (2021.05); *C12R 2001/01* (2021.05)

(58) Field of Classification Search
CPC .......... C05F 11/08; A01N 63/25; A01P 21/00; C12N 1/205; C12R 2001/01
See application file for complete search history.

(56) References Cited

FOREIGN PATENT DOCUMENTS

| | | |
|---|---|---|
| CN | 101967456 A | 2/2011 |
| CN | 110982740 A | 4/2020 |
| CN | 113980837 A | 1/2022 |
| CN | 117778250 A | 3/2024 |
| CN | 117801990 A | 4/2024 |
| WO | 2017069717 A1 | 4/2017 |
| WO | 2023151580 A1 | 8/2023 |

OTHER PUBLICATIONS

Method for the determination of soil total nitrogen(Semi-micro Kjeldahl method), China National Standards, China National Bureau of Standards (CNBS), 1987.
NY/T 889-2004, Determination of exchangeable potassium and non-exchangeable potassium content in soil, Agricultural Industry Standard of the People's Republic of China, 2005, Ministry of Agriculture of the PRC.
NY/T 1121.7-2014, Soil testing—Part 7: Method for determination of available phosphorus in soil, Agricultural Industry Standard of the People's Republic of China, 2014, Ministry of Agriculture of the PRC.
Zhang Aimin, et al., Application in tobacco and preparation of the fertilizer agent of Paenibacillus mucilaginosus CX_•9 strain, Journal of Hebei University(Natural Science Edition), 2013, pp. 387-393, vol. 33 No. 4.

*Primary Examiner* — Ali Soroush
*Assistant Examiner* — Andriae M Holt
(74) *Attorney, Agent, or Firm* — Bayramoglu Law Offices LLC

(57) ABSTRACT

A complex microbial agent and applications thereof are provided. The complex microbial agent includes nitrogen-fixing *Paenibacillus mucilaginosus* MSSW01, potassium-releasing *Paenibacillus mucilaginosus* MSSW02, and *Paenibacillus mucilaginosus* MSSW03. The complex microbial agent can effectively promote the growth of plants through strain screening and plant growth promotion experiments, which is of great significance for improving the growth status of crops in the environment and the rhizosphere environment of crops, and improving the effect of microbial fertilizers.

10 Claims, No Drawings

COMPLEX MICROBIAL AGENT AND APPLICATIONS THEREOF

CROSS REFERENCE TO THE RELATED APPLICATIONS

This application is a continuation application of International Application No. PCT/CN2024/111602, filed on Aug. 13, 2024, which is based upon and claims priority to Chinese Patent Application No. 202311799694.5, filed on Dec. 25, 2023, the entire contents of which are incorporated herein by reference.

TECHNICAL FIELD

The present disclosure relates to the technical field of biology engineering, and in particular to a complex microbial agent and applications thereof.

BACKGROUND

At present, the excessive use of chemical fertilizers and pesticides in agricultural planting has caused a series of pollution of the ecological environment. As a green and eco-friendly fertilizer, the microbial agent has the characteristics of increasing soil fertility, reducing the use of chemical fertilizers and pesticides, purifying and repairing soil, reducing plant diseases, improving quality and increasing production, and improving food safety.

At present, most commercial microbial agent products are single microbial agents, which have problems such as single function and poor yield increase. Due to the similar biological characteristics and mechanism of action of the strains, the synergistic use of the complex microbial agents prepared by the combination of different functional microbial strains can make up for many shortcomings of the single microbial agent, and effectively improve the effect of crop yield increase, which is the development trend of microbial agents.

Therefore, how to provide a microbial agent containing a variety of probiotics to solve the technical problem of the single function of the microbial agent of a single strain in the prior art is an urgent problem for those skilled in the art.

SUMMARY

An objective of the present disclosure is to provide a complex microbial agent and applications thereof.

In order to achieve the above objective, the present disclosure adopts the following technical solutions.

The present disclosure provides a complex microbial agent, including nitrogen-fixing *Paenibacillus mucilaginosus* MSSW01, potassium-releasing *Paenibacillus mucilaginosus* MSSW02 and *Paenibacillus mucilaginosus* MSSW03.

Preferably, a volume ratio of nitrogen-fixing *Paenibacillus mucilaginosus* MSSW01, potassium-releasing *Paenibacillus mucilaginosus* MSSW02 and *Paenibacillus mucilaginosus* MSSW03 is (1-2):(1-2):(1-2).

Preferably, bacterial contents of the nitrogen-fixing *Paenibacillus mucilaginosus* MSSW01, potassium-releasing *Paenibacillus mucilaginosus* MSSW02 and *Paenibacillus mucilaginosus* MSSW03 are $2\text{-}5\times10^9$ cfu·mL$^{-1}$, respectively.

Preferably, a bacterial content of the complex microbial agent is $2\text{-}5\times10^9$ cfu·mL$^{-1}$.

The present disclosure further provides an application of the complex microbial agent in planting a crop.

Preferably, the crop is wheat.

The present disclosure further provides an application of the complex microbial agent in fixing nitrogen, releasing potassium or releasing phosphorus for soil.

The present disclosure mixes the bacterial liquid of different strains and makes a complex microbial agent, which can provide a complex microbial agent product with better growth-promoting effect for the market.

The present disclosure obtains a complex microbial agent that can effectively promote the growth of plants through strain screening and plant growth promotion experiments, which is of great significance for improving the growth status of crops in the environment and the rhizosphere environment of crops, and improving the effect of microbial fertilizers.

Brief Description of Biological Preservation

Nitrogen-fixing *Paenibacillus mucilaginosus* MSSW01, Latin for *Paenibacillus mucilaginosus*, the strain is deposited in the China Center for Type Culture Collection, Address: Wuhan University, Wuhan, China, Date of preservation: Aug. 14, 2023, Preservation No: CCTCC NO: M 20231471.

Potassium-releasing *Paenibacillus mucilaginosus* MSSW02, Latin for *Paenibacillus mucilaginosus*, the strain is deposited in the China Center for Type Culture Collection, Address: Wuhan University, Wuhan, China, Date of preservation: Aug. 14, 2023, Preservation No: CCTCC NO: M 20231472.

*Paenibacillus mucilaginosus* MSSW03, Latin for *Paenibacillus mucilaginosus*; and the strain is deposited in the China Center for Type Culture Collection, Address: Wuhan University, Date of preservation: Aug. 14, 2023, Preservation No: CCTCC NO: M 20231473.

DETAILED DESCRIPTION OF THE EMBODIMENTS

In the following, the technical solutions provided by the present disclosure are described in detail in combination with the embodiments, but they cannot be understood as limiting the scope of protection of the present disclosure.

Embodiment 1

*Paenibacillus mucilaginosus* MSSW03 (a viable count of $3\times10^9$ cfu·mL$^{-1}$), *Paenibacillus mucilaginosus* MSSW02 (a viable count of $3\times10^9$ cfu·mL$^{-1}$), *Paenibacillus mucilaginosus* MSSW01 (a viable count of $3\times10^9$ cfu·mL$^{-1}$) were mixed according to the volume ratios of 1:1:1, 1:2:1, 1:1:2, and 2:1:1, respectively, to produce liquid complex microbial agents, named M1, M2, M3, and M4 in turn, as shown in Table 1. At the same time, the bacterial liquid of a single strain was retained, recorded as A1, A2, and A3, which were used as single microbial agents.

TABLE 1

Complex microbial agents and single microbial agents

| Name | Composition |
|---|---|
| M1 | 1:1:1 (MSSW01:MSSW02:MSSW03) |
| M2 | 1:2:1 (MSSW01:MSSW02:MSSW03) |
| M3 | 1:1:2 (MSSW01:MSSW02:MSSW03) |
| M4 | 2:1:1 (MSSW01:MSSW02:MSSW03) |

TABLE 1-continued

Complex microbial agents and single microbial agents

| Name | Composition |
|---|---|
| A1 | MSSW01 |
| A2 | MSSW02 |
| A3 | MSSW03 |

Embodiment 2

1. Crop Culture Experiment

1) Taking Jinchun No. 6 wheat as an example, the growth-promoting effect of complex microbial agents on crops was explored, and the optimal volume ratio of complex microbial agents was determined according to the comprehensive effect.

In plastic flowerpots with a length and width of 10 cm, the farmland soil was uniformly added and compacted to 1.5 cm away from the mouth of each flowerpot, 25 wheat seeds of approximately the same size were evenly placed into the soil, the soil was covered to the mouth of each flowerpot, an appropriate amount of water was added to maintain consistent humidity in the soil of each flowerpot, and a daily watering amount of each flowerpot was controlled to be the same. In the later stage, each flowerpot was watered every 2 days.

One week after emergence, the complex microbial agents in Embodiment 1 were inoculated by watering. 1 mL of complex microbial agents M1, M2, M3, and M4 were extracted, The mycelium was collected by centrifugation at 12000 r/min for 2 min, and washed with sterile water, and the concentration was adjusted to $2\times10^8$ CFU/ml. The mycelium was suspended in 9 mL of sterile distilled water and then 5 mL of the suspended mycelium was inoculated into flowerpots. Each flowerpot was inoculated once, and 5 replicates were set. A potted plant without being inoculated by the microbial agents was used as a black control group, and other commercially available microbial agent products (Shandong Mairuisi Biotechnology Co., Ltd.; complex microbial agent EM bacteria) were used as a conventional control group, being inoculated by the single strain bacterial solution A1, A2, and A3 as positive control groups, with the same way for inoculation, and all of them were set up with 5 replications.

2) Culture conditions: outdoor culture, watering with distilled water, and harvesting after 30 days.

3) After sowing for 30 days and harvesting, the whole plant of wheat in the flowerpot was carefully pulled out, most of the soil that stuck to the root was shaken off, then the whole plant of wheat was washed with tap water and wiped dry with newspaper, being laid flat on a table in turn, and a length from the cotyledon node to the growth point was measured with a ruler as a plant height of wheat; and a length of the third true cotyledon was measured with a ruler as a leaf length of wheat.

The roots of wheat were fibrous roots, which included seminal roots and secondary roots. The wheat plants were washed and wiped dry, and the number of elongated roots in the embryo of wheat seed was counted as the number of seminal roots, and the length from the root-stem junction of wheat to the longest root tip of the whole plant, that is, the longest seminal root length in the embryo of wheat seeds, was measured by a ruler as the maximum root length.

After the wheat plants were washed and wiped dry, the fresh weight was measured directly by a balance (accurate to 0.01 g). Then the wheat plants were dried in an oven, dried at 100° C. to constant weight, and the dry weight was measured. The above data was recorded, as shown in Table 2.

TABLE 2

Effects of different treatments on wheat traits

| Treatment | Plant height (cm) | Leaf length (cm) | Maximum root length (cm) | Fresh weight (g) | Dry weight (g) |
|---|---|---|---|---|---|
| Blank control group (ck) | 27.3 ± 1.5 | 9.7 ± 0.3 | 11.2 ± 0.2 | 9.5 ± 1.3 | 1.5 ± 0.1 |
| M1 | 32.5 ± 1.6 | 13.2 ± 0.5 | 13.2 ± 0.2 | 13.4 ± 1.2 | 2.9 ± 0.3 |
| M2 | 32.8 ± 1.4 | 13.8 ± 0.4 | 13.8 ± 0.1 | 13.5 ± 0.9 | 3.2 ± 0.2 |
| M3 | 32.2 ± 1.5 | 13.1 ± 0.4 | 13.4 ± 0.3 | 12.7 ± 0.8 | 2.0 ± 0.2 |
| M4 | 31.7 ± 1.4 | 13.0 ± 0.5 | 13.2 ± 0.2 | 12.9 ± 1.2 | 1.9 ± 0.3 |
| Conventional control group | 31.5 ± 1.3 | 13.5 ± 0.4 | 13.3 ± 0.3 | 13.2 ± 1.6 | 3.0 ± 0.5 |
| A1 | 32.1 ± 1.8 | 13.9 ± 1.0 | 13.0 ± 0.5 | 13.0 ± 0.7 | 2.9 ± 0.4 |
| A2 | 31.1 ± 1.5 | 12.9 ± 1.0 | 13.1 ± 0.5 | 12.0 ± 0.8 | 2.9 ± 0.4 |
| A3 | 31.5 ± 1.5 | 13.0 ± 1.0 | 13.2 ± 0.5 | 11.9 ± 0.8 | 3.0 ± 0.4 |

After wheat seedlings were treated with different bacterial suspensions, the growth of wheat seedlings was observed every day, and the growth of wheat plants was recorded on the 15th, 25th and 30th days. From 15 days, the growth began to show differences. Compared with the control group (ck), it could be clearly seen that the four microbial agent treatments had a significant role in promoting the growth of wheat. It could be seen from Table 2 that the plant height, leaf length, maximum root length, fresh weight and dry weight of wheat inoculated with complex microbial agent M2 were increased significantly compared with the blank control group, reaching 20.15%, 39.17%, 23.21%, 42.11% and 113.33%, respectively. At the same time, compared with the inoculation of single microbial agents and other commercially available microbial agents, the inoculation of complex microbial agent M2 had a better effect on the growth traits of wheat.

2. Determination Experiment of Soil Physical and Chemical Properties

After sowing for 30 days and harvesting in step (1), the potting soil of each test group was collected respectively, dried naturally, sieved and packed into plastic bags. The pH, and contents of organic matter, total nitrogen, rapidly available potassium and available phosphorus were determined, and the soil without planting wheat was used as an original soil group. Data was recorded, as shown in Table 3.

Determination of total nitrogen content in soil: referring to NY/T 53-1987 "Soil Total Nitrogen Determination Method (Semi-micro Kjeldahl Method)", under the action of sodium thiosulfate, concentrated sulfuric acid, perchloric acid and catalyst, it was completely converted into ammonium nitrogen by redox reaction. The ammonia from the digested solution after alkalization distillation was absorbed by boric acid, and titrated with standard hydrochloric acid solution, and the total nitrogen content in the soil was calculated according to the amount of standard hydrochloric acid solution.

Determination of rapidly available potassium in soil: referring to NY/T 889-2004 "Determination of Soil Rapidly Available Potassium and Slowly Available Potassium Content", 5 g air-dried soil sample passing through 1 m aperture sieve was weighed and put in a 100 mL triangular flask, 50.0 mL of ammonium acetate solution (soil-liquid ratio of 1:10)

was added, the bottle stopper was covered tightly, being shaken at 150 r/min-180 r/min for 30 min at 20° C.-25° C., and dry filtering. The filtrate was measured directly on a flame photometer.

Determination of soil available phosphorus: referring to NY/T 1121.7-2014 "Soil Tsting-Part 7: Determination of soil Available Phosphorus", available phosphorus in soil was extracted with 0.5 mol/L sodium bicarbonate solution (pH=8.5). Phosphorus in the extract reacted with molybdenum antimony anti-color reagent to form phosphorus molybdenum blue, and the absorbance was measured at a wavelength of 880 m. In a certain concentration range, the content of phosphorus and the absorbance value conformed to Lambert-Beer's law.

TABLE 3

Effects of applying complex microbial agents on soil fertility

| Treatment | pH | Total nitrogen content (mg·kg$^{-1}$) | Available phosphorus content (mg·kg$^{-1}$) | Rapidly available potassium content (mg·kg$^{-1}$) | organic matter content (mg·kg$^{-1}$) |
|---|---|---|---|---|---|
| Original soil | 7.5 | 15.7 ± 0.9 | 26.7 ± 1.3 | 10.5 ± 0.6 | 9.3 ± 0.2 |
| Blank control group (ck) | 7.5 | 25.0 ± 2.3 | 36.8 ± 1.5 | 18.9 ± 0.9 | 26.8 ± 1.3 |
| M1 | 7.4 | 60.4 ± 2.5 | 84.6 ± 2.5 | 50.3 ± 1.2 | 44.6 ± 2.3 |
| M2 | 7.4 | 60.7 ± 0.9 | 105.3 ± 2.3 | 55.6 ± 2.3 | 44.9 ± 2.7 |
| M3 | 7.3 | 45.1 ± 1.2 | 79.5 ± 1.8 | 65.2 ± 1.5 | 43.5 ± 2.4 |
| M4 | 7.4 | 71.3 ± 1.6 | 82.5 ± 1.4 | 53.2 ± 1.3 | 43.9 ± 2.6 |
| Conventional control group | 7.4 | 56.8 ± 0.4 | 80.5 ± 0.3 | 55.2 ± 1.6 | 44.3 ± 0.5 |
| A1 | 7.4 | 50.6 ± 1.2 | 49.6 ± 1.0 | 30.1 ± 1.1 | 23.4 ± 0.3 |
| A2 | 7.4 | 33.8 ± 1.3 | 80.6 ± 1.2 | 31.9 ± 1.1 | 18.5 ± 0.3 |
| A3 | 7.4 | 40.4 ± 0.8 | 55.2 ± 0.9 | 32.5 ± 1.2 | 23.6 ± 0.3 |

The experimental results were shown in Table 3, the contents of total nitrogen, available phosphorus, rapidly available potassium and organic matter in the soil inoculated with complex microbial agents were significantly higher than those in the uninoculated control group (CK). The maximum growth rates of each item were total nitrogen 185.2% (M4), rapidly available potassium 186.1% (M2), available phosphorus 244.9% (M3) and organic matter 67.54% (M2), respectively. The improvement effect of the experimental groups inoculated with complex microbial agents on the soil was higher than that of the blank control group and the conventional control group, which indicated that compared with the soil inoculated with a single strain, the synergistic effect of different functional microbial strains in the complex microbial agent could effectively make up for the shortcomings of the single microbial agent.

Based on the improvement of wheat growth traits and soil improvement, the complex microbial agent M2 with the composition ratio of MSSW01:MSSW02: MSSW03=1:2:1 had the best effect.

The above descriptions are only the preferred embodiments of the present disclosure. It is to be pointed out that those of ordinary skill in the art can also make several improvements and modifications without departing from the principle of the present disclosure, and such improvements and modifications shall fall within the protection scope of the present disclosure.

What is claimed is:

1. A complex microbial agent, comprising nitrogen-fixing *Paenibacillus mucilaginosus* MSSW01, potassium-releasing *Paenibacillus mucilaginosus* MSSW02, and *Paenibacillus mucilaginosus* MSSW03; wherein
the nitrogen-fixing *Paenibacillus mucilaginosus* MSSW01 has a preservation number of CCTCC NO: M 20231471;
the potassium-releasing *Paenibacillus mucilaginosus* MSSW02 has a preservation number of CCTCC NO: M 20231472; and
the *Paenibacillus mucilaginosus* MSSW03 has a preservation number of CCTCC NO: M 20231473.

2. The complex microbial agent according to claim 1, wherein a volume ratio of the nitrogen-fixing *Paenibacillus mucilaginosus* MSSW01, the potassium-releasing *Paenibacillus mucilaginosus* MSSW02, and the *Paenibacillus mucilaginosus* MSSW03 is (1-2):(1-2):(1-2).

3. The complex microbial agent according to claim 2, wherein a bacterial content of the complex microbial agent is 2-5×10$^9$ cfu·mL$^{-1}$.

4. A method for planting a crop, comprising inoculating the crop with the complex microbial agent according the claim 1.

5. The method according to claim 4, wherein the crop is wheat.

6. A method for fixing nitrogen, releasing potassium, or releasing phosphorus from the soil, comprising inoculating the soil with the complex microbial agent according to claim 1.

7. The method according to claim 4, wherein a volume ratio of the nitrogen-fixing *Paenibacillus mucilaginosus* MSSW01, the potassium-releasing *Paenibacillus mucilaginosus* MSSW02, and the *Paenibacillus mucilaginosus* MSSW03 is (1-2):(1-2):(1-2).

8. The method according to claim 7, wherein a bacterial content of the complex microbial agent is 2-5×10$^9$ cfu·mL$^{-1}$.

9. The method according to claim 6, wherein a volume ratio of the nitrogen-fixing *Paenibacillus mucilaginosus* MSSW01, the potassium-releasing *Paenibacillus mucilaginosus* MSSW02, and the *Paenibacillus mucilaginosus* MSSW03 is (1-2):(1-2):(1-2).

10. The method according to claim 9, wherein a bacterial content of the complex microbial agent is 2-5×10$^9$ cfu·mL$^{-1}$.

* * * * *